Patented May 1, 1928.

1,668,392

UNITED STATES PATENT OFFICE.

WILHELM BAUER, OF WIESDORF, NEAR LEVERKUSEN, GERMANY, ASSIGNOR TO THE FIRM: DURAND & HUGUENIN S. A., OF BASEL, SWITZERLAND.

MANUFACTURE OF WATER-SOLUBLE ESTER-LIKE DERIVATIVES OF VAT DYESTUFFS.

No Drawing. Application filed October 15, 1926, Serial No. 141,879, and in Germany October 26, 1925.

The specification of the U. S. Letters Patent No. 1,448,251 discloses a process for the manufacture of water-soluble ester-like derivatives of vat-dyestuffs especially valuable for dyeing and printing purposes, consisting in treating the leuco compounds of vat dyestuffs with a halogenide of a polybasic acid, especially with chlorosulphonic acid in presence of a tertiary base by exclusion of water with or without the use of an indifferent diluent.

Now I have found that the same products can be obtained by replacing the chlorosulphonic acid by the chloride of pyrosulphuric acid (Cl—SO$_2$—O—SO$_2$—Cl). This chloride can be produced at very low expense and it has also the great advantage that when it is used, a very small quantity of water in the leuco compound is harmless and has only the effect of a corresponding part of the chloride being also transformed into the active chlorosulphonic acid. The yields of ester are nearly quantitative.

The following examples illustrate the improved process, the parts being by weight.

Example I.

To a mixture of 100 parts of dimethylaniline and 150 parts of chlorobenzene are added drop by drop, in the cold, 40 parts of chloride of pyrosulphuric acid and 30 parts of dry dibromindigo white and the whole is stirred for some time in the cold. Then the temperature is allowed to rise within 6 hours, and while stirring continuously, to 60° C. and maintained for half an hour. The mass is then poured into a solution of 65 parts of soda. To eliminate the dimethylaniline and the chlorobenzene it is subjected to distillation by means of steam, then filtered, whereby a small amount of dibromindigo is recovered, thereupon concentrated in vacuo and salted out. The yield of pure ester in the form of sodium salt amounts to 85% of the theory.

Dibromindigo is obtained from indigo by brominating the same and corresponds to the following formula:

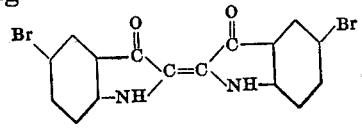

Example II.

Instead of 30 parts of dibromindigo white, I use 25 parts of a dry leuco compound of 4.5′-7′-trichlorindigo, as obtained in a known way, and thus obtain with a very good yield, the corresponding ester which, after development, dyes the fibre violet.

The 4.5′-7′-trichlorindigo above mentioned corresponds to the following formula:

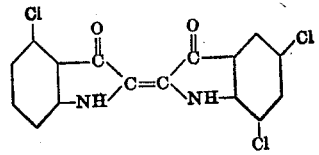

If in Example I the 30 parts of dibromindigo white are replaced by the corresponding quantity of a leuco compound of another vat-dyestuff, for example of the thioindigo or anthraquinone class, the reaction proceeds similarly.

What I claim is:—

1. A process for the manufacture of stable derivatives of vat-dystuffs in solid form, soluble in water and especially valuable for dyeing and printing purposes, consisting in treating a leuco compound of a vat-dyestuff with the chloride of pyrosulphuric acid in presence of an organic base.

2. A process for the manufacture of stable derivatives of vat-dyestuffs in solid form, soluble in water and especially valuable for dyeing and printing purposes, consisting in treating a leuco compound of an indigoid vat-dyestuff with the chloride of pyrosulphuric acid in presence of an organic base.

In witness whereof I have hereunto signed my name this 1st day of October 1926.

WILHELM BAUER.